(12) United States Patent
Wang et al.

(10) Patent No.: US 8,224,142 B2
(45) Date of Patent: Jul. 17, 2012

(54) NANO/MICRO-PATTERNED OPTICAL DEVICE AND FABRICATION METHOD THEREOF

(75) Inventors: Lon Wang, Taipei (TW); Jian-Hong Chen, Taipei (TW); Shih-Min Chuo, Taipei (TW)

(73) Assignee: National Taiwan University, Taipei (TW)

( * ) Notice: Subject to any disclaimer, the term of this patent is extended or adjusted under 35 U.S.C. 154(b) by 607 days.

(21) Appl. No.: 12/533,579

(22) Filed: Jul. 31, 2009

(65) Prior Publication Data

US 2011/0026876 A1 Feb. 3, 2011

(51) Int. Cl.
*G02B 6/10* (2006.01)
(52) U.S. Cl. .............. 385/129; 385/25; 385/26; 385/27; 385/28; 385/29
(58) Field of Classification Search .............. 385/25–38, 385/129–132
See application file for complete search history.

(56) References Cited

U.S. PATENT DOCUMENTS

| | | | |
|---|---|---|---|
| 6,621,951 B1 * | 9/2003 | Zhao et al. | 385/30 |
| 6,658,183 B1 | 12/2003 | Chandalia et al. | |
| 7,421,173 B2 | 9/2008 | Mazur et al. | |
| 2007/0289698 A1 | 12/2007 | Fleischman et al. | |

OTHER PUBLICATIONS

M. Sumetsky, "Basic Elements for Microfiber Photonics: Micro/Nanofibers and Microfiber Coil Resonators", Journal of Lightwave Technology, vol. 26, Issue 1, pp. 21-27, 2008, IEEE Xplore, USA.
Fei. Xu et al., "Demonstration of a Refractometric Sensor Based on Optical Microfiber Coil Resonator", Applied Physics Letters 2008, vol. 92, pp. 101126, American Institute of Physics, USA.

* cited by examiner

*Primary Examiner* — Michael Maskell
(74) *Attorney, Agent, or Firm* — Rabin & Berdo, P.C.

(57) ABSTRACT

A nano/micro-patterned optical device includes a soft film substrate and nano/micro thin wires. A surface of the soft film substrate includes a nano/micro-pattern formed through a lithography process, and the nano/micro-pattern includes a plurality of depressed grooves. The nano/micro thin wires are placed in the depressed grooves, and used to form a plurality of optical waveguides, in which the optical waveguides include at least one optical coupling region, and the optical coupling region is located on a joining position of the optical waveguides. A fabrication method of the nano/micro-patterned optical device is also provided.

20 Claims, 5 Drawing Sheets

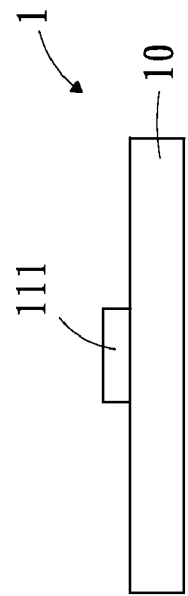
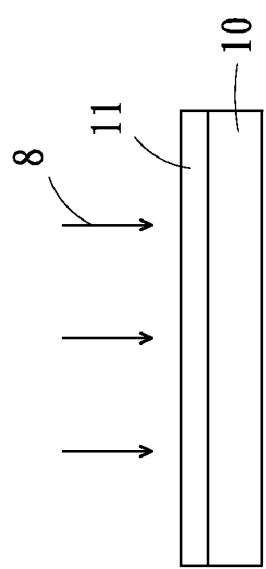
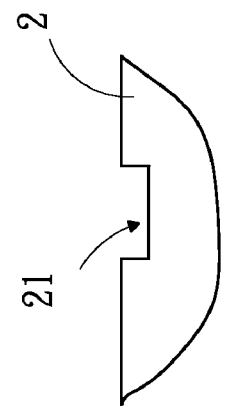
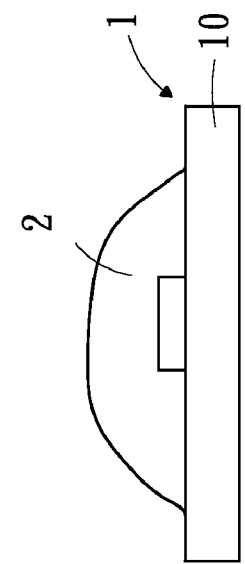

NANO/MICRO-PATTERNED OPTICAL DEVICE AND FABRICATION METHOD THEREOF

BACKGROUND

1. Technical Field

The present invention relates to an optical device and a fabrication method thereof, and more particularly to a nano/micro-patterned optical device and fabrication method thereof.

2. Related Art

In recent years, the fabrication of micro fibers has been developed and reported by many research teams, and various optical devices have been fabricated using such micro fibers. For example, in U.S. Pat. No. 7,421,173, sub-wavelength diameter silica wires for low-loss optical wave guiding are provided, in which Mazur et al. take a tapered sapphire rod as a uniform heating medium to be heated in a flame, such that the fiber is drawn out to generate nanometer-sized diameter silica fibers. In U.S. Pat. No. 6,658,183, a process for fabricating tapered micro structured fiber system and a resultant system are provided, in which Chandaoia et al. heat a photonic crystal fiber with a flame, and respectively stretch two ends thereof in opposite directions, so as to generate thin wires with a diameter of 10 micrometers ($\mu$m) in a manner similar to fabricating a coupler. Accordingly, the optical device fabricated by using the nano/micro-level fibers includes an annular resonant cavity, an annular laser, a sensor, a filter, and other types of optical devices. Until now, many relevant documents have been published and issued, for example, M. Sumetsky, "Basic Elements for Microfiber Photonics: Nano/microfibers and Microfiber Coil Resonators", Journal of Lightwave Technology, Vol. 26, Issue 1, pp. 21-27, 2008; or F. Xu et al., "Demonstration of a Refractometric Sensor Based on Optical Microfiber Coil Resonator", Applied Physics Letters 2008, Vol. 92, pp. 101126. However, a common point of the above researches is that the nano/micro-level thin wire is not correctly placed according to the design, such that the nano/micro-level thin wire cannot be applied to the devices requiring precise designs, for example, a 1550/980 nm wavelength division multiplexer.

Furthermore, a V-shaped depressed groove for placing a fiber in the prior art has a V-shaped cross section. For example, in U.S. Pat. No. 6,621,951, thin film structures in devices with a fiber on a substrate are provided, in which Zhao et al. form V grooves on a substrate, and deposit thin films made of different materials, the thin films are used to enhance the adhesion between the fibers and the grooves. In addition, in US Patent Application No. 2007/0289698, fiber pattern applicator systems and methods are provided, in which Fleischman et al. use a fiber writer device, which includes an elongated tube with a proximal end and a distal end. The proximal end is connected to a fiber spool, so as to feed the fiber material continuously, and the distal end points to the position for placing the fiber. In addition, the fiber to be placed is placed in a channel of the elongated tube.

In the above two US patents (U.S. Pat. No. 6,621,951 and US 2007/0289698), the straight-linear fibers and any fiber with varied configuration can be placed, but it is quite difficult to apply the above two US patents to the nano/micro-level fibers. When the diameter of the fiber is as small as several micrometers or hundreds of nanometers, the fiber is not visible by human eyes, so that it is difficult to manipulate the fiber and place the fiber in the groove with human hands. Furthermore, the nano/micro-level fiber is easily adhered to any surface, such that it is difficult to place the fiber while maintaining a straight line shape of the fiber, and in this case, the V-shaped depressed groove cannot be used for wiring. In addition, the weight of the nano/micro-level fiber is extremely small, and if the fiber is not adhered to a surface of the substrate, the nano/micro-level fiber possibly moves or is even blown away by air movements.

In view of the above, it is a key aim in this industry to develop a patterned optical device based on nano/micro wires and a fabrication method thereof.

SUMMARY

In view of the prior art, in order to satisfy the industrial demands the present invention provides a patterned optical device based on nano/micro wires, which includes a soft film substrate and nano/micro thin wires. A surface of the soft film substrate includes a nano/micro-pattern formed through a lithography process, and the nano/micro-pattern includes a plurality of depressed grooves and has hydrophobic property or hydrophilic property. The nano/micro thin wires are placed in the depressed grooves, and used to form a plurality of optical waveguides, in which the optical waveguides include at least one optical coupling region, and the optical coupling region is located on a joining position of the optical waveguides.

The present invention further provides a fabrication method of a nano/micro-patterned wire optical device, which includes the following steps. A lithography process is performed so as to form a nano/micro-pattern on a surface of a soft film substrate, in which the nano/micro-pattern includes a plurality of conformations. Then, nano/micro thin wires are provided and correspondingly combined with the conformations to form a plurality of optical waveguides, in which the optical waveguides include an optical coupling region, and the optical coupling region is located on a joining position of the optical waveguides.

In the present invention, the nano/micro-thin-wire optical device is fabricated through the lithography process and a manipulation tool, in which specific nano/micro-level pattern structures are fabricated through the lithography process, and the nano/micro-level pattern structures are enabled to have specific properties, for example, a hydrophilic property, a hydrophobic property, or other properties. Furthermore, the nano/micro thin wires are accurately disposed in the nano/micro-level pattern structures using the manipulation tool, so as to fabricate the nano/micro-thin-wire optical device accordingly. The nano/micro-thin-wire optical device has the following applications, including an optical switch and an optical cross-connect of an optical fiber communication network, a parallel projection system, a novel DVD pickup head, a novel display, and other related technologies. The above applications are only examples, and are not intended to limit the present invention.

BRIEF DESCRIPTION OF THE DRAWINGS

FIG. 1a is a schematic view of a lithography process according to a first example of the present invention;

FIG. 1b is a schematic view of a lithography process according to the first example of the present invention;

FIG. 1c is a schematic view of a lithography process according to the first example of the present invention;

FIG. 1d is a schematic view of a lithography process according to the first example of the present invention;

DETAILED DESCRIPTION

Figure 2:
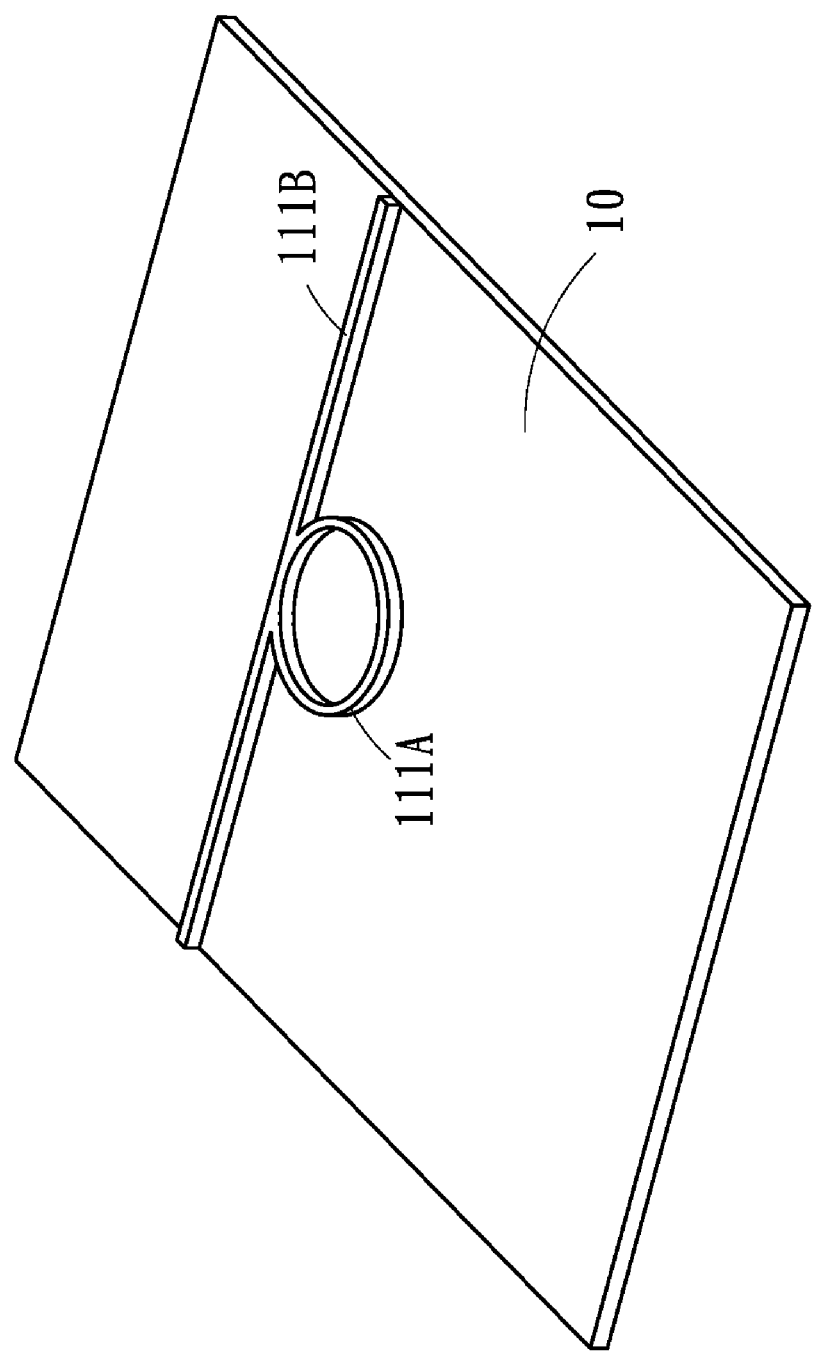
FIG. 2 is a schematic view of a transfer pattern according to the first example of the present invention.

The present invention provides a patterned optical device based on nano/micro wires and a fabrication method thereof. In order to make the present invention more comprehensible, detailed steps and structures thereof are illustrated in the following description. Apparently, the implementation of the present invention is not limited to special details known by persons skilled in the art. In another aspect, the well-known structures or steps are not described in detail, so as to prevent the present invention from being limited unnecessarily. Preferred embodiments of the present invention are described in detail below. However, in addition to the detailed description, the present invention can also be widely applied in other embodiments, and the protection scope of the present invention is not limited hereto, and falls in the appended claims.

In a first embodiment, the present invention provides a nano/micro-patterned wire optical device, which includes a soft film substrate and nano/micro thin wires. A surface of the soft film substrate includes a nano/micro-pattern formed through a lithography process, and the nano/micro-pattern includes a plurality of depressed grooves and has a hydrophobic property, a hydrophilic property, or other properties. The nano/micro thin wires are placed in the depressed grooves, and are used to form a plurality of optical waveguides. The optical waveguides include at least one optical coupling region, and the optical coupling region is located on a joining position of the optical waveguides.

Furthermore, the soft film substrate is a thermal curing material or an ultraviolet (UV)-curing material, and is preferably polydimethylsiloxane (PDMS), polycarbonate, polyvinyl chloride, polyethylene terephthalate, or polystyrene.

In addition, the nano/micro thin wire is selected from a group consisting of silicon, silicon dioxide, and a high molecular polymer, and a diameter thereof falls between 10 nanometers (nm) and 100 micrometers (μm). Furthermore, the nano/micro thin wire further includes at least one dopant, and the dopant is preferably selected from a group consisting of metal elements, luminescent molecules, and luminescent atoms, and any combination thereof, in which the dopant has a property of gaining the laser energy.

In a preferred example of this embodiment, the nano/micro wire optical device further includes microstructures formed on the surface of the soft film substrate, and used to reduce an adhesion force between the soft film substrate and the nano/micro thin wires, in which the microstructures are preferably particle structures, columnar structures, or other protruding structures.

In another preferred example of this embodiment, the nano/micro wire optical device further includes a packaging structure used to package and wrap the nano/micro thin wires in the depressed grooves, in which the packaging structure is made of a thermal curing material or a UV-curing material.

In a second embodiment, the present invention provides a fabrication method of a nano/micro-patterned wire optical device, which includes the following steps.

Firstly, a lithography process is performed, so as to form a nano/micro-pattern on a surface of a soft film substrate, in which the nano/micro-pattern includes a plurality of conformations and preferably has a hydrophobic property, a hydrophilic property, or other properties. Then, nano/micro thin wires are provided and correspondingly combined with the conformations to form a plurality of optical waveguides. The optical waveguides include at least one optical coupling region, and the optical coupling region is located on a joining position of the optical waveguides.

The lithography process is any one selected from a group consisting of photolithography, electron beam lithography, laser direct write lithography, optical interference lithography, and nano imprint lithography.

In a preferred example of this embodiment, when the conformations are planar structures, the nano/micro thin wires are disposed above the conformations. When the conformations are depressed structures, the nano/micro thin wires are disposed in the conformations. When the conformations are protruding structures, the nano/micro thin wires are disposed on side surfaces of the conformations.

In another preferred example of this embodiment, the lithography process includes the following steps. Firstly, an exposure and development process is performed to form a mother film, in which the mother film has a transfer pattern on a surface thereof. Next, a soft film polymer is provided, which is the above soft film substrate in a liquid state, and meanwhile the soft film polymer is coated on the surface of the mother film. Then, a curing process is performed to cure the soft film polymer, so as to form the soft film substrate having the nano/micro-patterned corresponding to the transfer pattern. Finally, a rolling-over process is performed to separate the soft film substrate from the surface of the mother film. The mother film is selected from a group consisting of a silicon-based substrate, a glass substrate, PDMS, a high molecular polymer, a glass substrate, and any combination thereof.

In a more preferred example of this embodiment, the fabrication method further includes performing a packaging process to package and combine the nano/micro thin wires with the conformations by using a packaging material, in which the packaging material is a thermal curing material or a UV-curing material.

In a most preferred example of this embodiment, the fabrication method further includes providing a manipulation tool. The manipulation tool includes a tungsten needle and a multiple-degree-of-freedom (m-DOF) micro-positioning platform having multiple DOFs of X, Y, Z, θx, etc. The tungsten needle is used to contact and move the nano/micro thin wires. The m-DOF micro-positioning platform is connected to the tungsten needle and is used to move the tungsten needle, so as to correspondingly dispose the nano/micro thin wires in the conformations by using the tungsten needle. In addition, in the above preferred example, the fabrication method further includes providing an interface agent to reduce an adhesion force between the soft film substrate and the nano/micro thin wires, such that the tungsten needle is enabled to move the nano/micro thin wires conveniently. The interface agent is a highly volatile liquid, and is preferably ethanol.

In another aspect, the soft film substrate is a thermal curing material or a UV-curing material, and is preferably PDMS, polycarbonate, polyvinyl chloride, polyethylene terephthalate, or polystyrene.

In addition, the nano/micro thin wire is selected from a group consisting of silicon, silicon dioxide, and a high molecular polymer, and a diameter thereof falls between 10 nm and 100 μm. Furthermore, the nano/micro thin wire further includes at least one dopant, and the dopant is preferably selected from a group consisting of metal elements, luminescent molecules, luminescent atoms, and any combination thereof, in which the dopant has a property of gaining the laser energy.

The materials of the soft film substrate, the nano/micro thin wires, the dopant, and the mother film in the above description are only examples, but not intended to limit the present invention.

FIRST EXAMPLE

In Step I, a lithography process, including Step IA and Step IB, is performed, as shown in FIGS. 1a to 1d, so as to form at least one nano/micro-pattern 21 on a surface of a soft film substrate 2, and the nano/micro-pattern 21 includes a plurality of depressed grooves. The depressed groove may have a square, circular arc-shaped, V-shaped, or polygonal cross section or a cross section in any other shape, and the square cross section is taken as an example here.

In Step IA, an exposure and development process is performed to form a mother film 1, in which the mother film 1 has at least one transfer pattern 111 on a surface thereof. Step IA further includes Step i and Step ii.

In Step i, a negative photoresist SU8-2010 (MicroChem) and a negative photoresist SU8-2005 (MicroChem) are mixed on a spin coating platform for 5 seconds at a speed of 500 revolutions per minute. Then, a photoresist 11 with a thickness of 5 μm is formed on a surface of a silicon-based substrate 10 by spin-coating the mixed negative photoresist for 30 seconds at a speed of 3000 revolutions per minute.

In Step ii, a soft bake is performed on the photoresist 11 having the thickness of 5 μm for 3 minutes at a temperature of 95° C. Next, an exposure bake is performed at a temperature of 95° C. for 3 minutes by using an exposure light source 8; then, a development process is performed for 1 minute; and a hard bake is performed at a temperature of 95° C. for 5 minutes, thereby obtaining the mother film 1 having the transfer pattern 111 on the surface thereof. The transfer pattern 111 includes an annular protruding structure 111A and a linear protruding structure 111B, as shown in FIG. 2.

In Step IB, at least one nano/micro-pattern 21 is formed on the surface of the soft film substrate 2. Step IB includes Step iii and Step iv, in which the nano/micro-pattern 21 includes an annular depressed structure 21A and a linear depressed structure 21B.

In Step iii, a coating process is performed, in which a soft film polymer (not shown), is coated on the surface of the mother film 1 having the transfer pattern 111. Then, a curing process is performed to cure the soft film polymer (not shown), through thermal curing process, so as to form the soft film substrate 2 having the nano/micro-pattern 21 corresponding to the transfer pattern 111. The soft film polymer (not shown), is a soft film substrate in a liquid state, which is PDMS (RTV184, Dow Corning 10:1).

Figure 3:
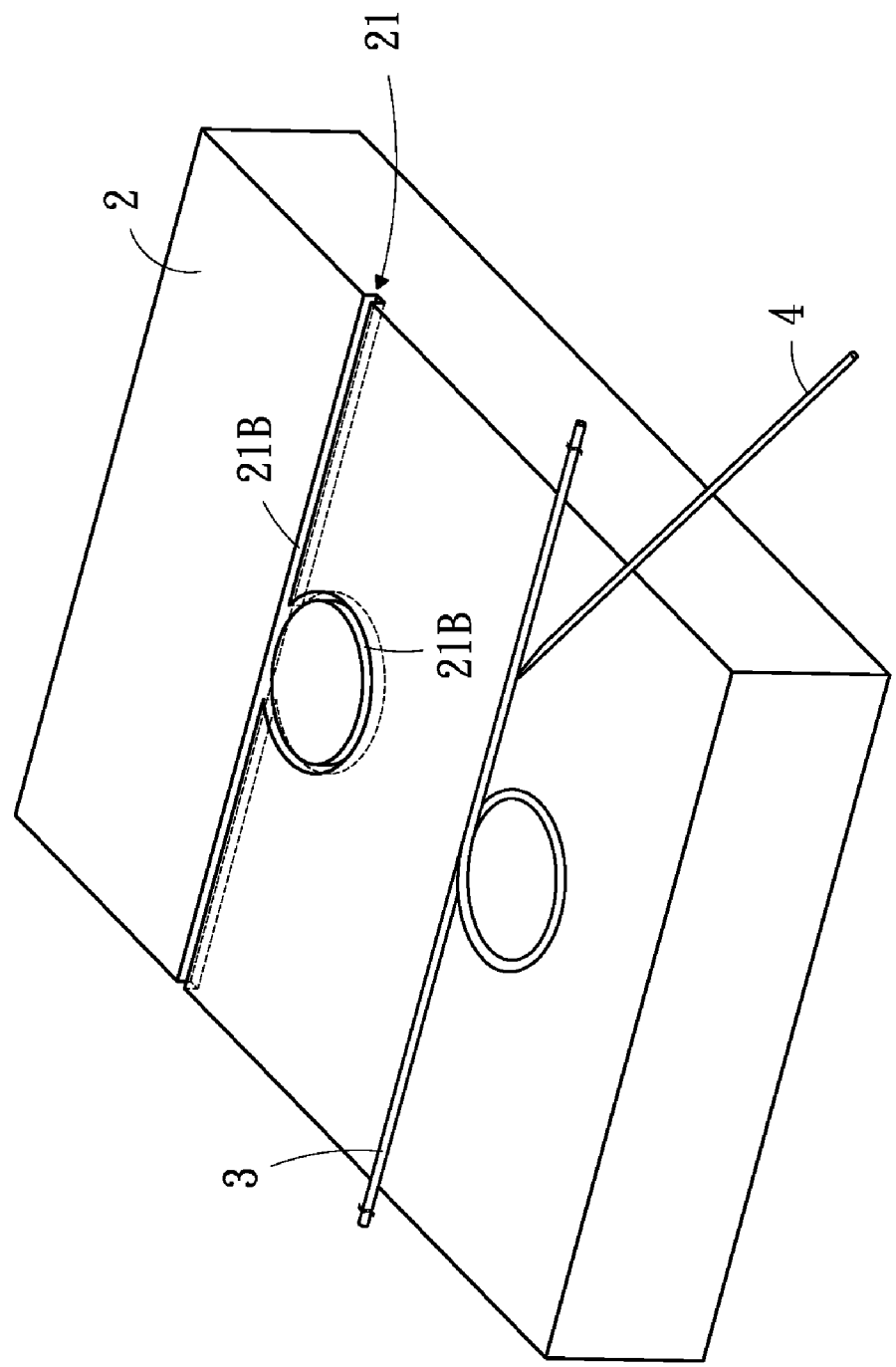
FIG. 3 is a schematic view of a nano/micro-pattern according to the first example of the present invention.

In Step iv, a rolling-over process is performed to separate the soft film substrate 2 from the surface of the mother film 1, as shown in FIG. 3. In addition, a cutting step is further performed on the soft film substrate.

In Step II, at least one nano/micro thin wire 3 is provided.

Figure 4:
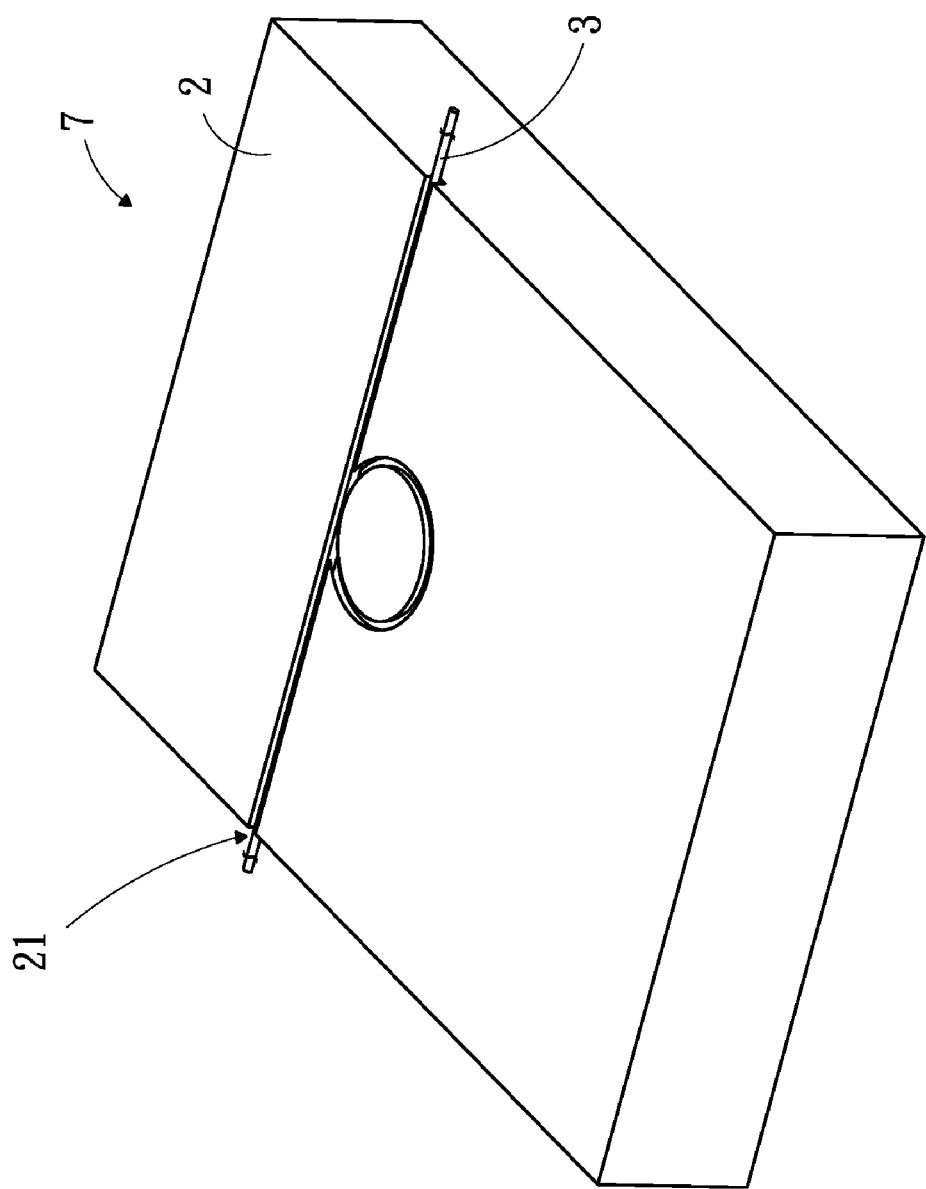
FIG. 4 is a schematic view of a nano/micro-patterned wire optical device according to the first example of the present invention.

In Step III, a placing process is performed. The nano/micro thin wires are placed in the depressed grooves by using a manipulation tool. The manipulation tool includes a tungsten needle 4 and a 4-DOF micro-positioning platform (not shown), having 4 DOFs of X, Y, Z, and θx. The tungsten needle is connected to the 4-DOF micro-positioning platform (not shown), and is driven by the 4-DOF micro-positioning platform (not shown), so as to contact and move the nano/micro thin wires 3, such that the nano/micro thin wires 3 are moved and correspondingly disposed in an annular depressed groove 21A and a linear depressed groove 21B, as shown in FIG. 4.

In addition, a diameter of the nano/micro thin wires is approximately 2 μm, and a radius of curvature of the tungsten needle 4 is also approximately 2 μm. The curvature of the tungsten needle 4 may be adjusted in the following manner. The tungsten needle 4 and a round graphite electrode (not shown), are respectively placed in two vessels (not shown), containing potassium hydroxide solution with a concentration of 2M. The tungsten needle 4 is connected to a positive electric so as to form a positive pole, and the graphite electrode (not shown), acts as a negative pole. Once an external voltage of 10 volts is applied, the tungsten needle 4 has an oxidation-reduction reaction and produces partially ionized metal ions, thereby gradually becoming thinner. Furthermore, through a control of Z axis (not shown), of the 4-DOF micro-positioning platform, the tungsten needles 4 with different radiuses of curvature may be obtained. In addition, during operation, due to an adhesion force between the nano/micro thin wires 3 and the soft film substrate 2, the tungsten needle 4 cannot easily move the nano/micro thin wires 3. Therefore, a high-purity volatile ethanol (not shown), is added to the surface of the soft film substrate 2, so as to reduce the adhesion force.

In Step IV, a packaging process is performed. The nano/micro thin wires 3 are packaged and wrapped in the annular depressed groove 21A and the linear depressed groove 21B by using a packaging material (not shown), so as to complete the fabrication of the nano/micro-patterned wire optical device 7.

SECOND EXAMPLE

Figure 5:
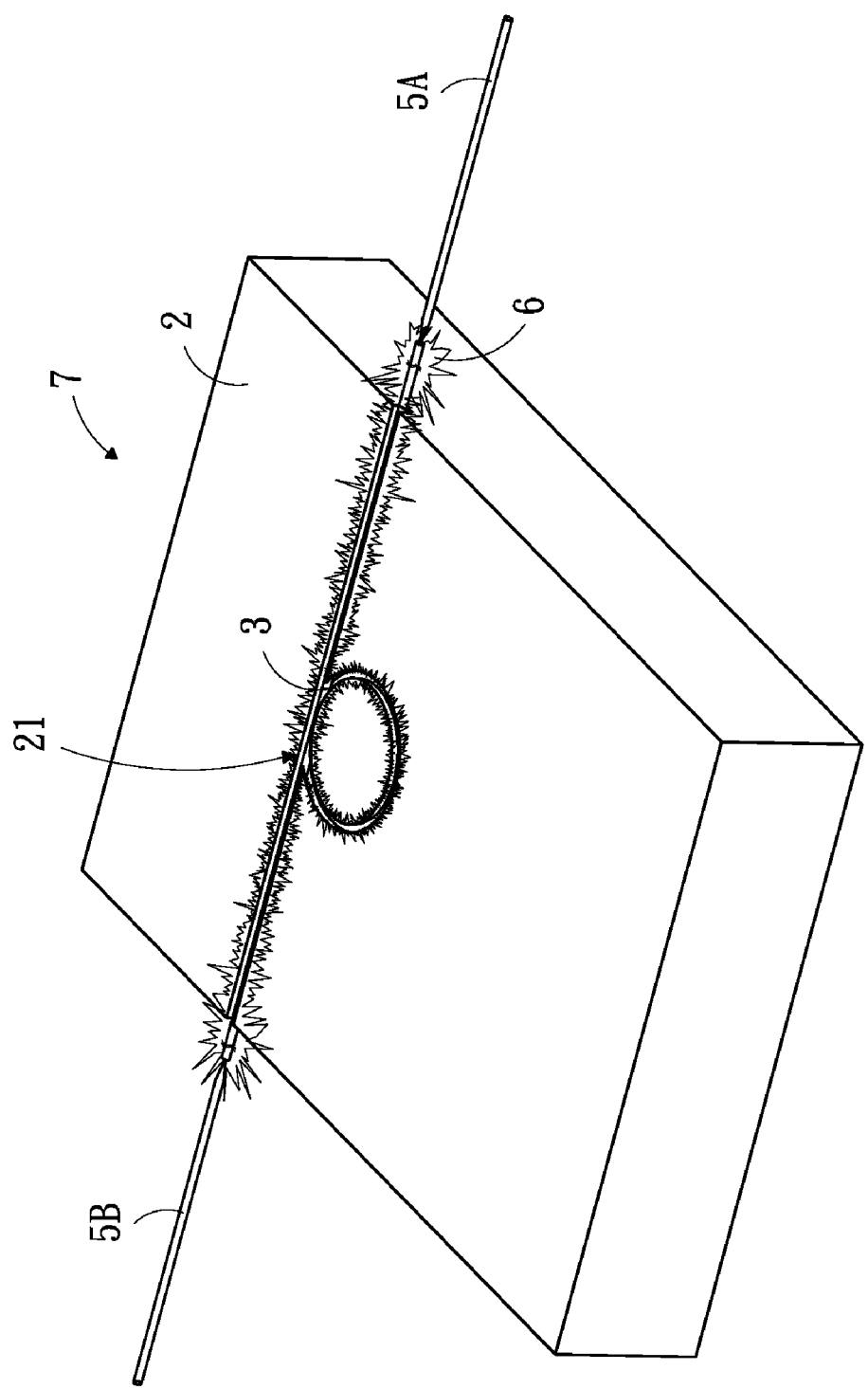
FIG. 5 is a schematic view of an optical coupling of a nano/micro-patterned wire optical device according to the second example of the present invention.

Please refer to FIG. 5, in which a tapered fiber coupler 5A and a tapered fiber coupler 5B are provided. A red light 6 generated by a helium-neon laser is guided to the nano/micro thin wires 3 located at the nano/micro-pattern 21 in an evanescent wave manner, so as to measure a specific transmission spectrum of the nano/micro-patterned wire optical device 7, and obtain a transmission coefficient, an attenuation coefficient, and a coupling loss thereof through a program simulation. An energy attenuation of a resonance spectrum of the nano/micro-patterned wire optical device 7 may reach 7 dB.

In addition, the tapered fiber coupler 5A and the tapered fiber coupler 5B are fabricated by using an ERICSSON FSU 975 fusion splicer (not shown). The fusion splicer applies the electrode discharge to fuse the standard single mode fibers (not shown). Furthermore, a translation platform (not shown), controlled by a piezoelectric material stretches and extends the standard single mode fibers (not shown). Next, through a multi-stage discharging process, the tapered fiber coupler 5A and the tapered fiber coupler 5B with a tapered tip thereof being the same as the nano/micro thin wires 3 in size are obtained.

While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A nano/micro-patterned wire optical device, comprising:

a soft film substrate, wherein a surface of the soft film substrate comprises at least one nano/micro-pattern formed through a lithography process, and the nano/micro-pattern comprises a plurality of depressed grooves; and at least one nano/micro thin wire, placed in the depressed grooves, and used to form a plurality of optical waveguides, wherein the optical waveguides comprise at least one optical coupling region, and the optical coupling region is located on a joining position of the optical waveguides.

2. The nano/micro wire optical device according to claim 1, wherein the soft film substrate is a thermal curing material or an ultraviolet (UV)-curing material.

3. The nano/micro wire optical device according to claim 1, wherein the soft film substrate is independently selected from a group consisting of polydimethylsiloxane (PDMS), polycarbonate, polyvinyl chloride, polyethylene terephthalate, polystyrene, and any combination thereof.

4. The nano/micro wire optical device according to claim 1, further comprising at least one microstructure, formed on the surface of the soft film substrate, and used to reduce an adhesion force between the soft film substrate and the nano/micro thin wires, wherein the microstructure is a particle structure, a columnar structure, or another protruding structure.

5. The nano/micro wire optical device according to claim 1, wherein the nano/micro thin wire is selected from a group consisting of silicon, silicon dioxide, and a high molecular polymer.

6. The nano/micro wire optical device according to claim 1, wherein a diameter of the nano/micro thin wire falls between 10 nanometers (nm) and 100 micrometers ($\mu$m).

7. The nano/micro wire optical device according to claim 1, wherein the nano/micro thin wire comprises at least one dopant, the dopant is independently selected from a group consisting of a metal element, a luminescent molecule, a luminescent atom, and any combination thereof, and the dopant has a property of gaining a laser energy.

8. The nano/micro wire optical device according to claim 1, further comprising: a packaging structure, for packaging and wrapping the nano/micro thin wire in the depressed groove respectively, wherein the packaging structure is made of a thermal curing material or a UV-curing material.

9. The nano/micro wire optical device according to claim 1, wherein the nano/micro-pattern has a hydrophobic property or a hydrophilic property.

10. A fabrication method of a nano/micro-patterned wire optical device, comprising:

performing a lithography process to form at least one nano/micro-pattern on a surface of a soft film substrate, wherein the nano/micro-pattern comprises a plurality of conformations, and the lithography process is selected from a group consisting of photolithography, electron beam lithography, laser direct write lithography, optical interference lithography, and nano imprint lithography; and providing at least one nano/micro thin wire and correspondingly combining the nano/micro thin wires with the conformations to form a plurality of optical waveguides, wherein the optical waveguides comprise at least one optical coupling region, and the optical coupling region is located on a joining position of the optical waveguides.

11. The fabrication method according to claim 10, wherein the lithography process comprises:

performing an exposure and development process to form a mother film, wherein the mother film has at least one transfer pattern on a surface thereof;

providing a soft film polymer, wherein the soft film polymer is the soft film substrate in a liquid state;

performing a coating process to coat the soft film polymer on the surface of the mother film;

performing a curing process to cure the soft film polymer and form the soft film substrate having the nano/micro-pattern corresponding to the transfer pattern; and performing a rolling-over process to separate the soft film substrate from the surface of the mother film.

12. The fabrication method according to claim 11, wherein the mother film is selected from a group consisting of a silicon-based substrate, a glass substrate, polydimethylsiloxane (PDMS), a high molecular polymer, and any combination thereof.

13. The fabrication method according to claim 10, wherein each of the conformations is selected from a group consisting of a planar structure, a depressed structure, a protruding structure, and any combination thereof.

14. The fabrication method according to claim 10, wherein the soft film substrate is a thermal curing material or an ultraviolet (UV)-curing material.

15. The fabrication method according to claim 10, wherein the soft film substrate is independently selected from a group consisting of PDMS, polycarbonate, polyvinyl chloride, polyethylene terephthalate, polystyrene, and any combination thereof.

16. The fabrication method according to claim 10, wherein the nano/micro thin wire is selected from a group consisting of silicon, silicon dioxide, a high molecular polymer, and any combination thereof.

17. The fabrication method according to claim 10, wherein a diameter of the nano/micro thin wire falls between 10 nanometers (nm) and 100 micrometers ($\mu$m).

18. The fabrication method according to claim 10, wherein the nano/micro thin wire comprises at least one dopant, the dopant is independently selected from a group consisting of a metal element, a luminescent molecule, a luminescent atom, and any combination thereof, and the dopant has a property of gaining a laser energy.

19. The fabrication method according to claim 10, further comprising: performing a packaging process to package and combine the nano/micro thin wires with the conformations by using a packaging material, wherein the packaging material is a thermal curing material or a UV-curing material.

20. The fabrication method according to claim 10, further comprising:

providing an interface agent to reduce an adhesion force between the soft film substrate and the nano/micro thin wires, wherein the interface agent is a volatile liquid; and providing a manipulation tool, wherein the manipulation tool comprises:

a tungsten needle, for contacting and moving the nano/micro thin wires; and a multiple-degree-of-freedom (m-DOF) micro-positioning platform, connected to the tungsten needle, and used for moving the tungsten needle, so as to correspondingly move and dispose the nano/micro thin wires in the conformations by using the tungsten needle, wherein the m-DOF micro-positioning platform has multiple DOFs of X, Y, Z, $\theta$x, etc.

* * * * *